(12) United States Patent
Chou

(10) Patent No.: US 7,780,127 B2
(45) Date of Patent: Aug. 24, 2010

(54) HEIGHT ADJUSTING APPARATUS

(75) Inventor: Cheng-Hung Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 333 days.

(21) Appl. No.: 11/964,795

(22) Filed: Dec. 27, 2007

(65) Prior Publication Data

US 2009/0121099 A1  May 14, 2009

(30) Foreign Application Priority Data

Nov. 9, 2007  (CN) .................... 2007 1 0202454

(51) Int. Cl.
 *F16M 11/24* (2006.01)
(52) U.S. Cl. .................................. 248/188.2
(58) Field of Classification Search .......... 248/188.2, 248/188.5; 353/70, 119
 See application file for complete search history.

(56) References Cited

U.S. PATENT DOCUMENTS

| | | | |
|---|---|---|---|
| 7,025,522 B2* | 4/2006 | Sicz et al. ............... | 403/109.2 |
| 7,490,902 B2* | 2/2009 | Aubert ..................... | 297/300.5 |
| 2004/0208687 A1* | 10/2004 | Sicz et al. ............... | 403/109.3 |
| 2006/0244932 A1* | 11/2006 | Hsu et al. ................. | 353/119 |

FOREIGN PATENT DOCUMENTS

JP  2002139796 A  5/2002

* cited by examiner

*Primary Examiner*—Ramon O Ramirez
(74) *Attorney, Agent, or Firm*—Jeffrey T. Knapp

(57) ABSTRACT

A height adjusting apparatus, for adjusting the height of a projector, includes a support leg, an air-pressure cylinder connected to the projector, and a switch. The air-pressure cylinder and the support leg together form a sealed chamber. When the pressure of the air inside the chamber is regulated, the height of the air-pressure cylinder and the height of the projector change. The switch is mounted on the air-pressure cylinder to create a gap to allow air to exit or enter the chamber when the switch is open.

9 Claims, 4 Drawing Sheets

HEIGHT ADJUSTING APPARATUS

BACKGROUND OF THE INVENTION

1. Field of the Invention

The present invention relates to height adjusting apparatus, and more particularly to a height adjusting apparatus for adjusting the height of a projector.

2. Description of Related Art

Traditionally, a projector is generally seated on a flat supporting surface such as a table and projects an image onto a screen through a projection lens located in a front of the projector. If the projected image is not aligned properly with the screen, the projector height is usually adjusted. To adjust the height of the projector, and thus the projecting angle of the projection lens relative to the screen, height adjusting legs, located in the front of the projector, are adjusted.

Referring to FIG. 4, a related height adjusting apparatus for a projector 10 comprises two screw-typed support legs 15 engaged with two sides of the front of the projector 10. Each support leg 15 comprises a support foot 151 and a screw portion 153 connected to the support foot 151. Adjustments to the height of the projector is made by turning the screws clockwise or counter clockwise. Because it may be a bit unwieldy to adjust with the support foot 151 touching the support surface, the support foot 151, and hence the projector 10, is lifted from the support surface and the screws are turned to adjust the height. However, this adjustment may have to be done a few times to get the image properly aligned with the screen and this process can be tedious and time consuming.

What is needed, therefore, is a height adjusting apparatus, for a projector, to easily and quickly adjust the height of the projector in order to properly align the projected image on the screen.

SUMMARY OF THE INVENTION

A height adjusting apparatus, for adjusting the height of a projector, includes a support leg, an air-pressure cylinder connected to the projector, and a switch. The air-pressure cylinder and the support leg together form a sealed chamber. When the air pressure in the chamber is adjusted, the height of the air-pressure cylinder and the height of the projector change. The switch is mounted on the air-pressure cylinder to create a gap to allow air to exit or enter the chamber when the switch is open.

BRIEF DESCRIPTION OF THE DRAWINGS

Many aspects of the present height adjusting apparatus can be better understood with reference to the following drawings. The components in the drawings are not necessarily drawn to scale, the emphasis instead being placed upon clearly illustrating the principles of the present height adjusting apparatus. Moreover, in the drawings, like reference numerals designate corresponding parts throughout the several views.

DETAILED DESCRIPTION OF THE INVENTION

Figure 1:
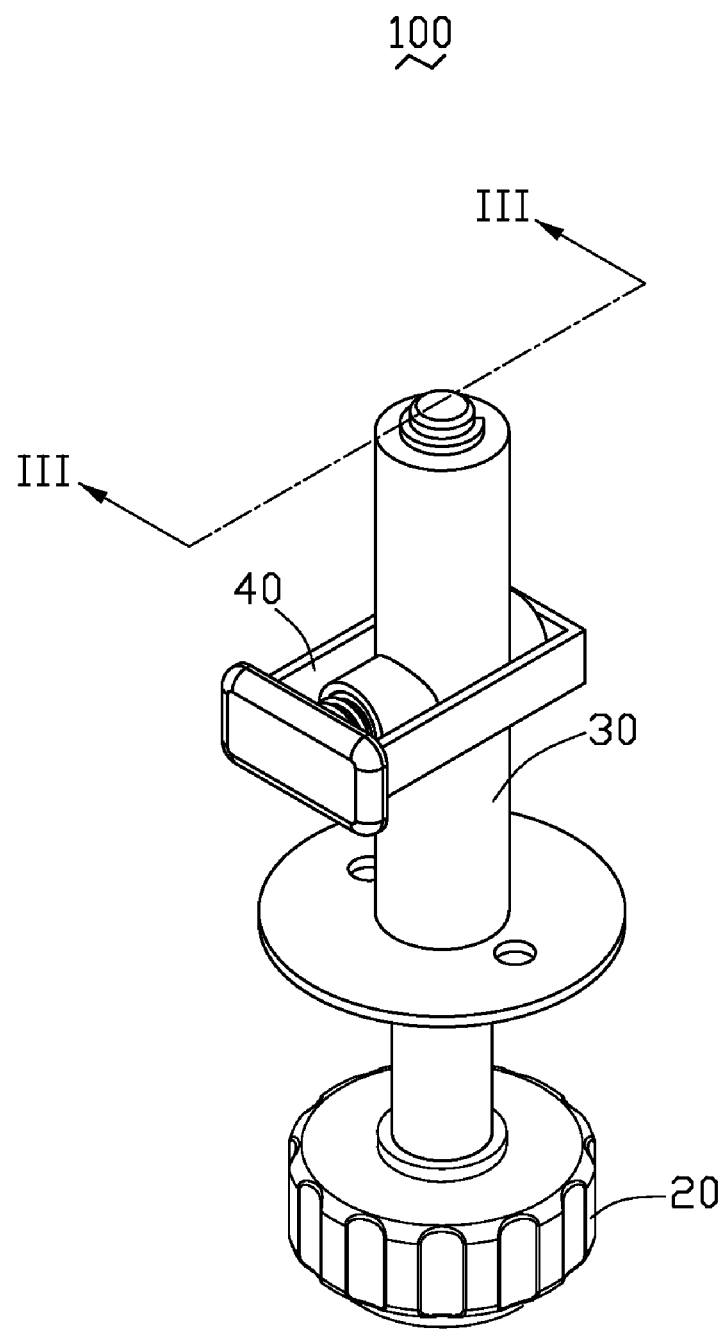
FIG. 1 is an assembled, isometric view of a height adjusting apparatus for supporting a projector in accordance with a preferred embodiment of the present invention.
Figure 2:
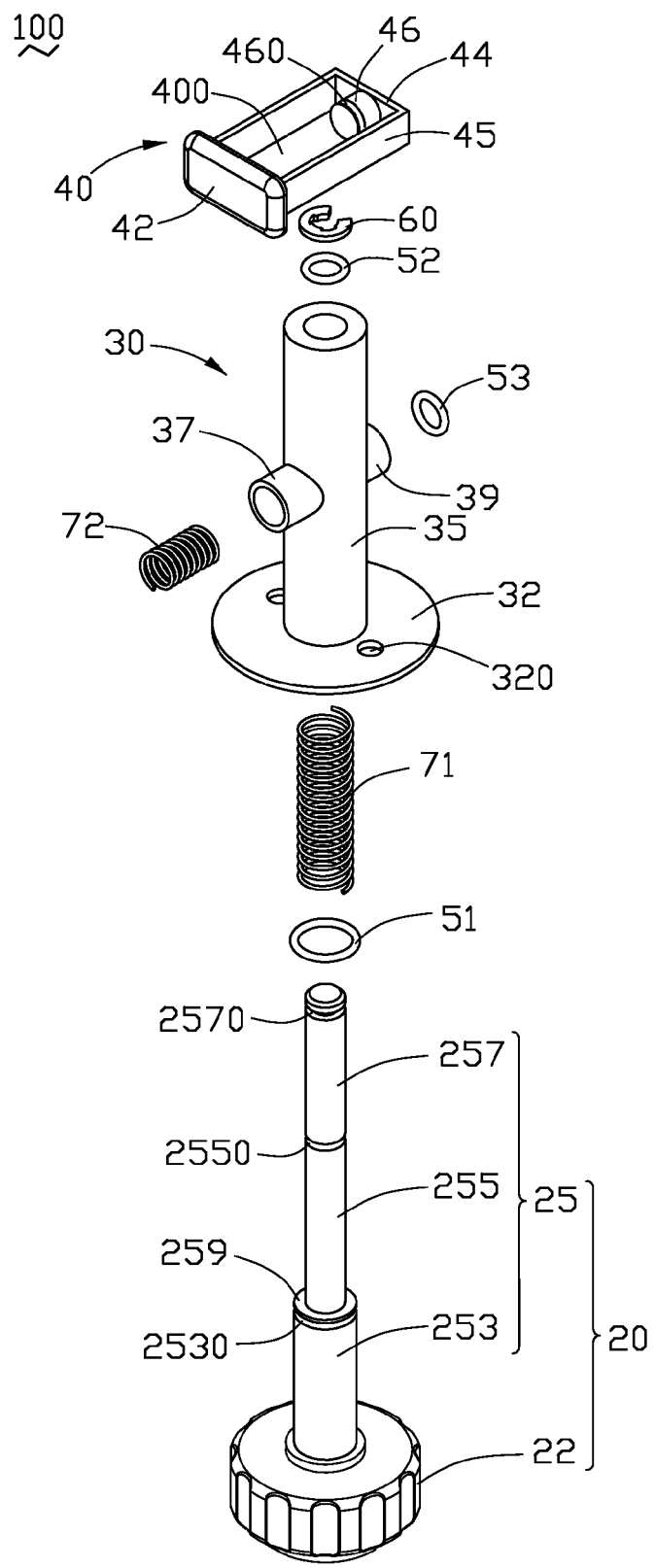
FIG. 2 is an exploded view of FIG. 1.

FIGS. 1 and 2 show a height adjusting apparatus 100 of a preferred embodiment of the invention. The height adjusting apparatus 100 comprises a support leg 20 and an air-pressure cylinder 30 connected to the support leg 20. The support leg 20 extends through the air-pressure cylinder 30. The projector connects with the air-pressure cylinder 30. The support leg 20 and the air-pressure cylinder 30 together form a sealed chamber. When the pressure of the air inside the chamber is regulated, the volume of the chamber changes. So the height of the air-pressure cylinder 30 and the height of the projector changes relative to the support leg 20. A switch 40 is mounted on the air-pressure cylinder 30, activating this switch 40 will create a gap (or close the gap) between the surrounding air and the chamber. The height adjusting apparatus 100 adjusts the height of the front of the projector relative to the support leg 20 via adjusting the air pressure in the chamber.

The support leg 20 comprises a shaft 25 and a support foot 22 mounted on a bottom of the shaft 25. The shaft 25 comprises an engaging section 255 in a central portion thereof, a support section 253 and a guide section 257 extending from two ends of the engaging section 255 respectively. The support section 253 extends from a centre of a top of the support foot 22. The support section 253, the engaging section 255 and the guide section 257 each have a cylindrical configuration and a common axis. A diameter of the engaging section 255 is the same as that of the guide section 257, and smaller than that of the support section 253, so that the shaft 25 has an upper annular step surface 259 between the support section 253 and the engaging section 255. The support section 253 defines a recess 2530 near a top end thereof close to the engaging section 255 for engaging with a seal ring 51. A recess 2550 is defined between the engaging section 255 and the guide section 257 for engaging with a seal ring 52. The guide section 257 defines a recess 2570 for engaging with an E-shaped stop ring 60.

The support foot 22 has a cylindrical configuration. The foot 22 has a rubber bottom face to make contact with the supporting surface for improving stability of the height adjusting apparatus 100.

Figure 3:
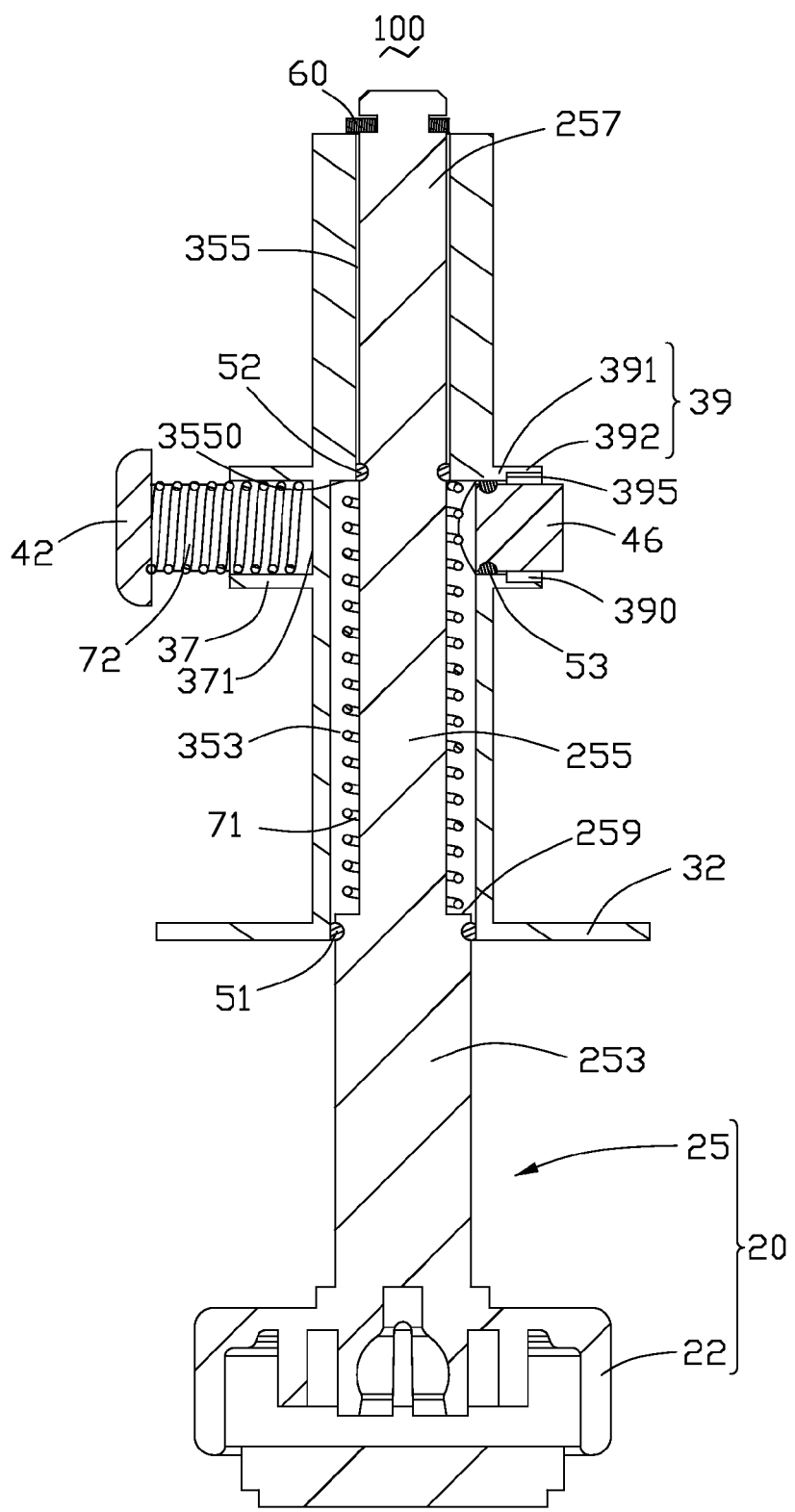
FIG. 3 is a cross-sectional view of the height adjusting apparatus of FIG. 1, taken along line III-III thereof.
Figure 4:
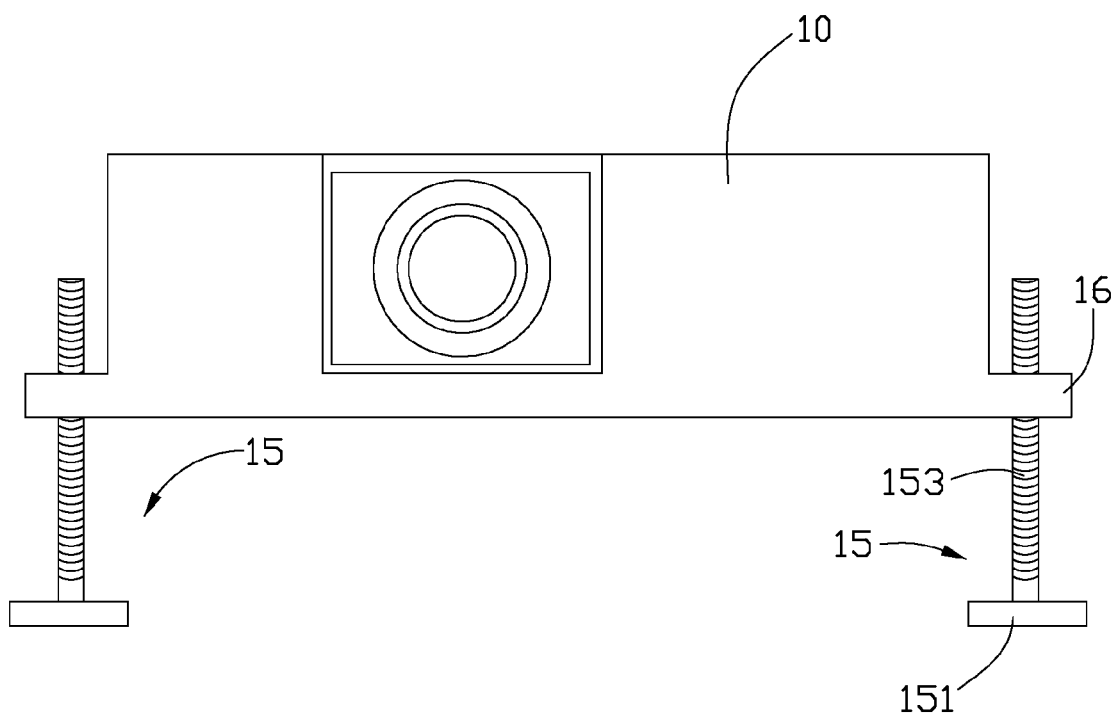
FIG. 4 is an isometric view of a related height adjusting apparatus engaged with a projector.

Referring to FIG. 3 also, the air-pressure cylinder 30 comprises a main body 35, a mounting portion 32 extending outwardly from a bottom end of the main body 35, a first extending member 37 and a second extending member 39 extending from opposite outside surfaces at a central portion of the main body 35. The main body 35 has a sleeve configuration and defines a cylindrical first cavity 353 below the extending member 37 and a second cavity 355 above the extending member 37. The second cavity 355 communicates with the first cavity 353. A diameter of the first cavity 353 is slightly larger than that of the support section 253 of the shaft 25. A diameter of the second cavity 355 is smaller than that of the first cavity 353 and little larger than that of the guide section 257. The main body 35 has a downward annular step surface 3550 at a joint of the first and second cavities 353, 355. The mounting portion 32 has a discal configuration and defines two holes 320 at two flanks of the main body 35. The projector is mounted on the mounting portion 32 and can be secured by the two holes 320. The first and second extending members 37, 39 each have a tubular configuration and define a central hole (not labeled). The central hole of the first extending member 37 is separated from the first and second cavities 353, 355 by an inner wall 371 of the extending member 37. The central hole of the second extending member 39 communicates with the second cavity 355. The second extending member 39 has a connecting portion 391 connecting with the main body 35 and an outer portion 392 connecting with the connecting portion 391. A central hole 390 of the outer portion 392 is larger than a central hole (not labeled) of the connecting portion 391 so as to form an annular step surface 395.

The switch 40 has a rectangular reconfiguration, comprising a push plate 42, a back plate 44 opposite to the push plate 42, and two lateral plates 45 connecting perpendicularly with the push plate 42 and the back plate 44. The push plate 42, the back plate 44, the two later plates 45 cooperatively define a through chamber 400 for providing passage of the main body 35 of the air-pressure cylinder 30. A plunger 46 extends from the back plate 44 toward the push plate 42. The plunger 46 comprises a cylindrical stopper (not labeled). The stopper defines a recess 460 at a distant end thereof for receiving a seal ring 53.

The height adjusting apparatus 100 further comprises a first spring 71 and a second spring 72. Each of the first and second springs 71, 72 is a compression spring. The first spring 71 has an inside diameter larger than the diameter of the engaging section 255 and an outside diameter smaller than the diameter of the support section 253. The first spring 71 is shorter than the engaging section 255 in an axial direction. A diameter of the second spring 72 is less than an inside diameter of the first extending member 37, thus the second spring 72 can be received in the first extending member 37.

In assembly, the first spring 71 is mounted around the engaging section 255 of the shaft 25. The seal rings 51, 52 are received in the recesses 2530, 2550 of the shaft 25. The main body 35 of the air-pressure cylinder 30 loosely fits around the shaft 25, wherein the engaging section 255 is received in the first cavity 353, and the guide section 257 of the shaft 25 is received in the second cavity 355. The E-shaped stop ring 60 is engaged in the recess 2570 for preventing the air-pressure cylinder 30 from sliding upwardly. The first spring 71 has an end (not labeled) contacting the step surface 259 of the shaft 25 and other end (not labeled) contacting the step surface 3550 of the air-pressure cylinder 30. The switch 40 is mounted around the first and second extending members 37, 39 with the plunger 46 engaged in the second extending member 39. The second spring 72 has an end received in the first extending member 37 and abutting against the inner wall 371 of the first extending member 37, and has another end contacting the push plate 42 of the switch 40. The air-pressure cylinder 30 and the support leg 20 together form the sealed chamber with the seal rings 51, 52, 53. The front of the projector is mounted on the mounting portion 32 of the air-pressure cylinder 30, and the height of the front of the projector can be adjusted relative to the support leg 20.

When the front of the projector needs to be adjusted to be lower, firstly, the push plate 42 of the switch 40 is pushed toward the air-pressure cylinder 30. This compresses the second spring 72. The plunger 46 in the second extending member 39 slides from the connecting portion 391 to the outer portion 392, thus creating a gap between the chamber and the surrounding air. Then, the air-pressure cylinder 30 is pressed downwardly relative to the support leg 20 so that the first spring 71 is compressed between the two step surfaces 259, 3550. When the height of the air-pressure cylinder 30 reaches a determined height, the switch 40 is released. The elastic force of the spring 72 pushes the plate 42 of the switch 40 away from the cylinder 30 so that the plunger 46 slides into the connecting portion 391. Thus, the gap between the chamber and the surrounding air is closed and the chamber, of the air-pressure cylinder 30, is sealed. Due to the air-tight chamber and the unchanged pressure of the chamber, the elastic force of the compressed first spring 71 is not strong enough to expand first spring 71 and the volume of the chamber is unchanged. Thus, the height of the air-pressure cylinder 30 relative to the support leg 20 is temporarily fixed due to the unchanging volume of the chamber.

When the front of the projector needs to be adjusted higher, the push plate 42 of the switch 40 is pushed toward the air-pressure cylinder 30. The plunger 46 in the second extending member 39 slides from the connecting portion 391 to the outer portion 392, thus creating a gap between the chamber and the surrounding air. This gap is adjusted to allow air into the chamber in order to control the force of the first spring 71 to push the air-pressure cylinder 30 upwards to the desired height. Then the switch 40 is released closing the gap and sealing the chamber and the desired height of the air-pressure cylinder 30 relative to the support leg 20 is maintained.

Due to the switch 40 of the height adjusting apparatus 100, the height of the front of the projector is adjusted easily by the movement of the air-pressure cylinder 30 relative to the support leg 20. Accordingly, a projecting angle of projection lens of the projector is adjusted relative to a screen.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A height adjusting apparatus for adjusting a height of a projector, the height adjusting apparatus comprising:
   a support leg;
   an air-pressure cylinder, the air-pressure cylinder and the support leg together forming a sealed chamber, wherein the height of the air-pressure cylinder and the height of the projector changes when the air pressure in the chamber is adjusted, the air-pressure cylinder comprising a main body and a mounting portion, the mounting portion extending outwardly from a bottom of the main body and adapted for connecting with the projector; and
   a switch being mounted on the air-pressure cylinder to create a gap to allow air to exit or enter the chamber when the switch is open.

2. The height adjusting apparatus as described in claim 1, wherein the support leg comprises a shaft and a support foot mounted on a bottom of the shaft.

3. The height adjusting apparatus as described in claim 2, wherein the shaft of the support leg comprises a support section and an engaging section, the engaging section being smaller than the support section, the main body defining a cavity receiving the support section and the engaging section.

4. The height adjusting apparatus as described in claim 3, wherein the main body of the air-pressure cylinder extends a first extending member and a second member therefrom, the switch engaging with the first extending member and the second extending member.

5. The height adjusting apparatus as described in claim 4, wherein the switch comprises a plunger, the plunger engaging in the second extending member to create the gap between surrounding air and the chamber.

6. The height adjusting apparatus as described in claim 5, wherein the switch comprises a push plate, a back plate opposite to the push plate, and two lateral plates connecting with the push plate and the back plate, the plunger extending from the back plate.

7. The height adjusting apparatus as described in claim 6, wherein a spring is received in the first extending member and contacts the push plate of the switch.

8. The height adjusting apparatus as described in claim 1, wherein a spring is located between the air-pressure cylinder and the support leg.

9. The height adjusting apparatus as described in claim 8, wherein the spring is located in the sealed chamber.

* * * * *